United States Patent
Jung

[19]

[11] Patent Number: 5,964,137
[45] Date of Patent: Oct. 12, 1999

[54] BANTAM TWIN PIPE NOTCHER

[76] Inventor: William Emil Jung, 1401 W. Hwy. 50, Box 141, Clermont, Fla. 34711

[21] Appl. No.: 09/121,568
[22] Filed: Jul. 23, 1998
[51] Int. Cl.$^6$ ...................................................... B26D 1/06
[52] U.S. Cl. ............................... 83/620; 83/693; 83/917; 83/54
[58] Field of Search .............................. 83/917, 54, 692, 83/693, 683, 588, 620, 618

[56] References Cited

U.S. PATENT DOCUMENTS

| | | | |
|---|---|---|---|
| 2,192,531 | 3/1940 | Grady | 83/414 |
| 2,579,675 | 12/1951 | Kaplan et al. | 409/256 |
| 2,765,848 | 10/1956 | Bakula | 164/50 |
| 2,776,003 | 1/1957 | Koster | 164/17 |
| 2,964,984 | 12/1960 | Schott | 83/694 |
| 3,099,182 | 7/1963 | Alverson | 83/383 |
| 3,120,143 | 2/1964 | Kreider | 83/454 |
| 3,143,018 | 8/1964 | Everett | 83/214 |
| 3,153,360 | 10/1964 | Coulon | 83/191 |
| 3,180,196 | 4/1965 | Coulon et al. | 83/581 |
| 3,234,838 | 2/1966 | Faull | 83/454 |
| 3,405,583 | 10/1968 | Herzog | 83/588 |
| 3,410,168 | 11/1968 | Feitshans | 83/588 |
| 3,446,105 | 5/1969 | Herzog | 83/146 |
| 3,653,301 | 4/1972 | Clendenin et al. | 92/62 |
| 3,938,413 | 2/1976 | Goettel et al. | 83/145 |
| 3,971,275 | 7/1976 | Mach | 83/140 |
| 4,180,893 | 1/1980 | Avalon | 29/33 K |
| 4,194,422 | 3/1980 | Williams | 83/581 |
| 4,337,680 | 7/1982 | Borzym | 83/456 |
| 4,459,886 | 7/1984 | Belzil | 83/178 |
| 4,476,082 | 10/1984 | Burns et al. | 264/288.4 |
| 4,562,760 | 1/1986 | Kinsley | 83/693 |
| 4,877,174 | 10/1989 | Bruhn | 228/5.1 |
| 4,930,384 | 6/1990 | Nakatsuji | 83/54 |
| 4,986,154 | 1/1991 | Vernacchio | 83/54 |

*Primary Examiner*—M. Rachuba
*Assistant Examiner*—Stephen Choi
*Attorney, Agent, or Firm*—Dennis G. LaPointe; Mason & Associates, P.A.

[57] ABSTRACT

An apparatus for cutting notches in the ends of metal or plastic pipes and tubes, the apparatus being a bantam twin pipe notcher, comprising a base plate with alignment pins for mounting to a press; the base plate further including two vertical parallel die holders wherein a spring-loaded punch holder with a cutting tool and die blocks are mounted therebetween. The opposite ends of the cutting tool has cutting ends of different radii or shapes for notching two different size pipes or tubes without interchanging the tool and die combination.

7 Claims, 5 Drawing Sheets

BANTAM TWIN PIPE NOTCHER

BACKGROUND OF THE INVENTION

1. Field of the Invention

The invention relates to a device capable of notching the ends of two different shapes or two different size metal or plastic pipes and tubes so that they may be fitted to the sides of other pipes or tubes, without interchanging the tool and die combination.

2. Description of Related Art

Pipe and tube notchers are known in the art. However, known pipe or tube notchers generally incorporate features that allow for the notching of a specific shape and size. If a different shape or size is required, either a second press or other hydraulic means of punching the shape is necessary or the punch and die block needs to be disassembled and interchanged with an appropriate sized and shaped punch and die block.

Known related art includes a hand operated portable device depicted in U.S. Pat. No. 2,765,848 to Bakula, and the tube cutting apparatus of U.S. Pat. No. 3,143,018 to Everett. Other known related art tube or pipe cutters and notchers include U.S. Pat. No. 2,776,003 to Koster, U.S. Pat. Nos. 3,153,360 and 3,180,196 to Coulon, U.S. Pat. No. 3,234,838 to Faull, U.S. Pat. No. 4,194,422 to Williams, U.S. Pat. No. 4,562,760 to Kingsley, U.S. Pat. No. 4,930,384 to Nakatsuji, and U.S. Pat. No. 4,986,154 to Vernacchio.

None of the devices in the above references solve the problem of eliminating the need for an additional press or the need for disassembling the punch and die block and interchanging a different size or shaped punch and die combination whenever two different size or shaped pipes and tubes are being worked-on in the field. For example, it is very common that a fabricator at a construction site may be cutting and mating pipe segments to form a railing wherein 1¼ inch pipe and 1½ inch pipe are being used. An object of the present invention would provide a device which has the capability of notching both sizes, thereby saving fabrication time and associated construction costs.

SUMMARY OF THE INVENTION

The present invention is a bantam twin pipe notcher capable of notching two different size pipes and/or two different shaped notches without interchanging the tool and die combination.

The invention is adapted such that notches will be sheared outwardly from the interior of the pipe or tube so that all distorting and flattening of the pipe or tube is avoided.

The invention can be placed in a punch press or actuated in any other desired way, such as by means of hydraulic jacks or levers. The device is easily adapted to accommodate pipe and tubes of various diameters or shapes and to form notches of various radii or shapes so that it may be used for forming notches in the ends of both round and square pipes and tubes as well as in flat sheet metal strips if desired.

The principal object of the invention is to provide a device wherein the ends of two different size pipes or tubes can be notched without necessitating the breakdown of the tool and die combination and substituting an appropriate tool and die combination.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
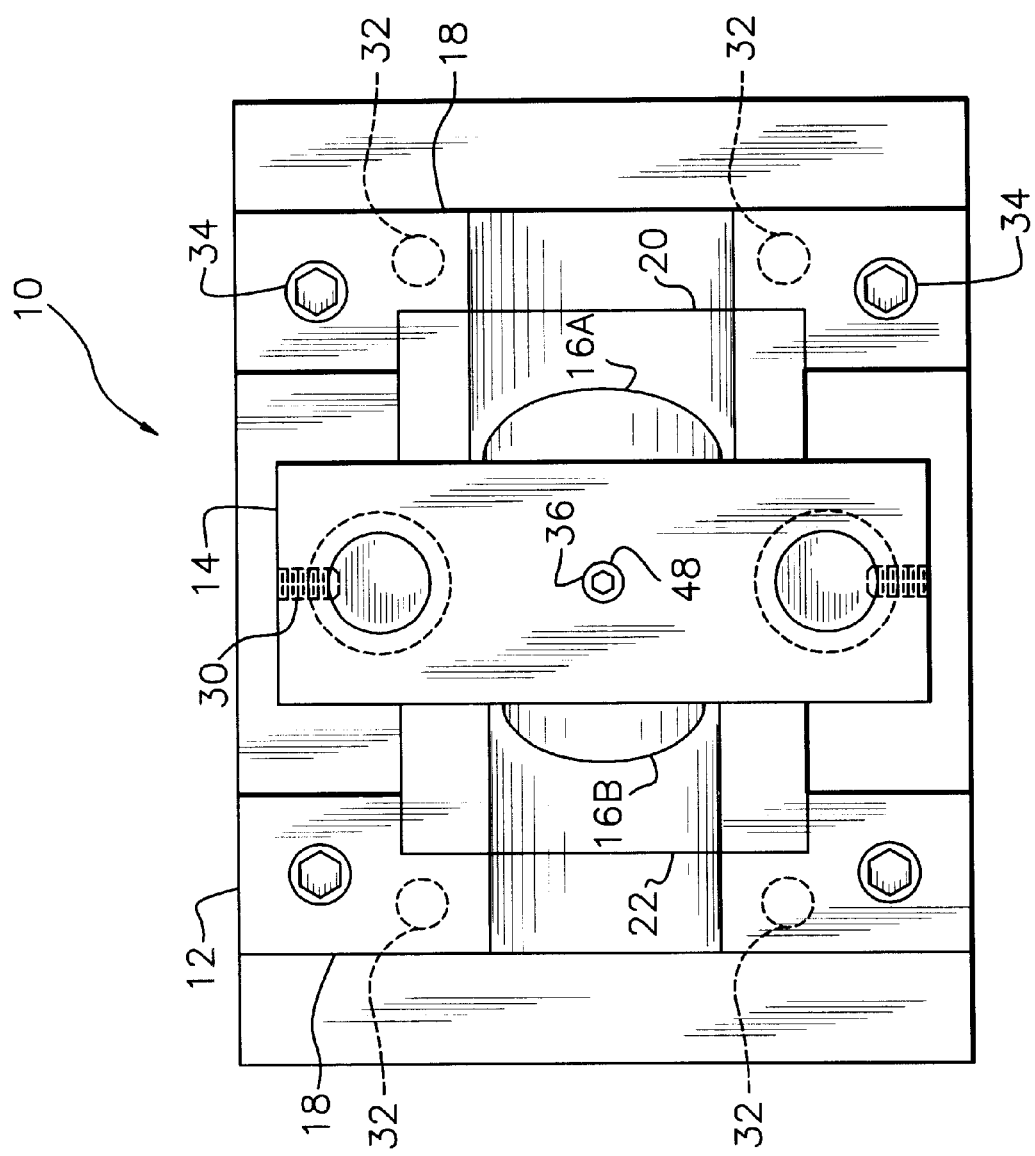
FIG. 1 is a perspective plan view of the present invention.
Figure 2:
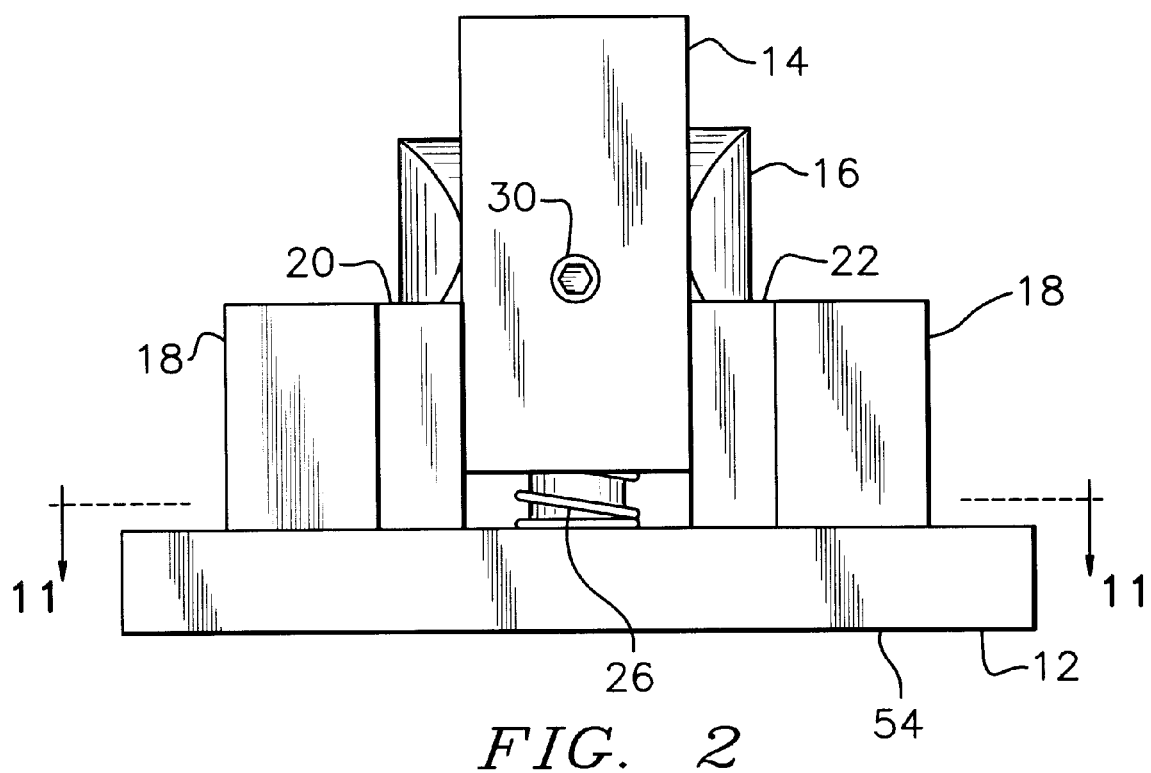
FIG. 2 is a perspective elevational side view of the present invention.
Figure 3:
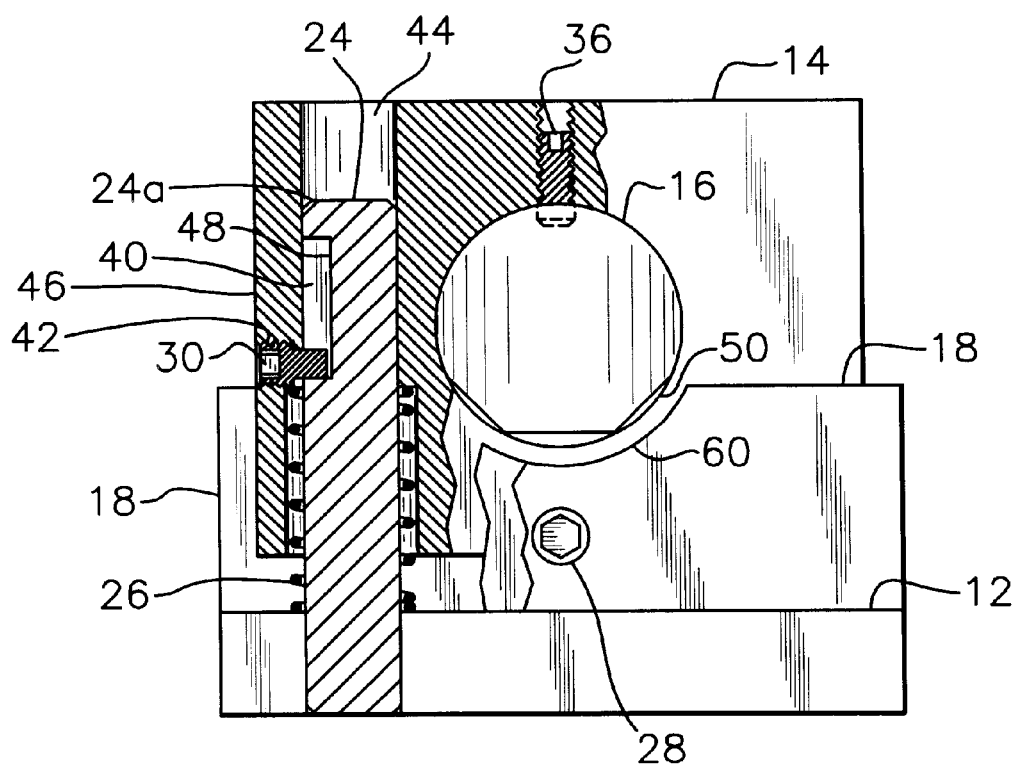
FIG. 3 is a perspective partial cross-sectional view of the present invention depicting a guide pin and compression spring in the punch holder.
Figure 8:
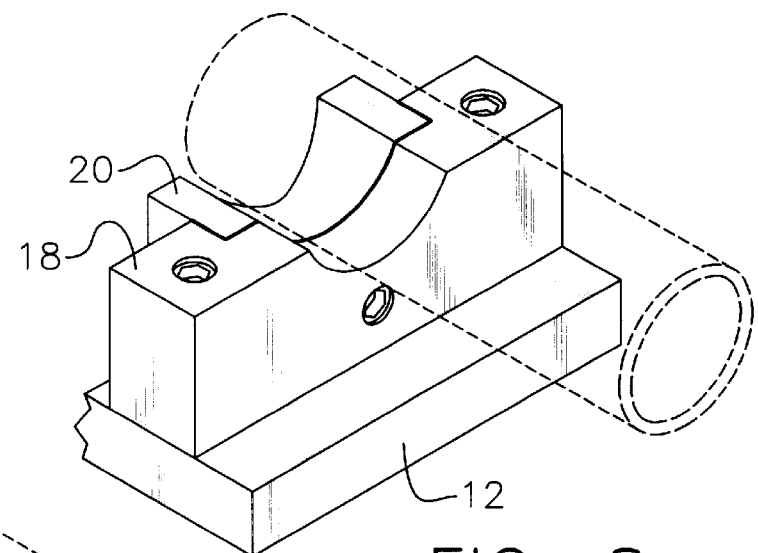
FIG. 8 is a perspective view of a portion of the present invention depicting the base plate, a die holder and a die block, the die holder and the die block configured such that a round pipe can rest on the die holder and die block.
Figure 9:
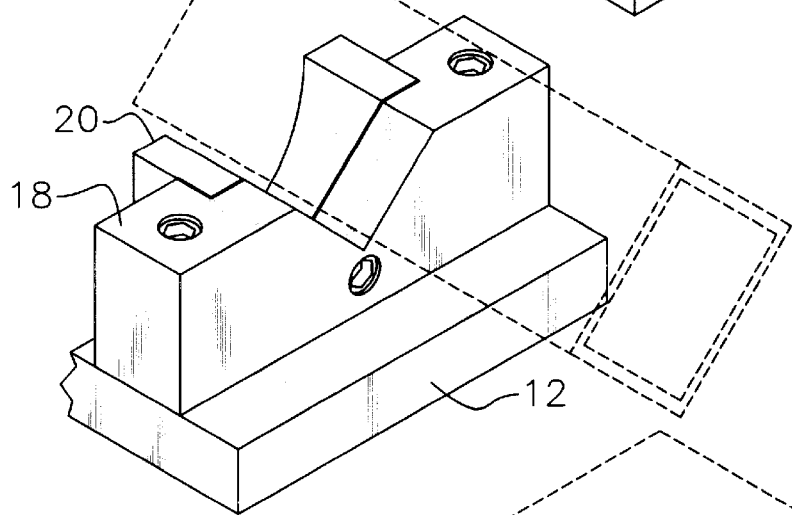
FIG. 9 is a perspective view of a portion of the present invention depicting the base plate, a die holder and a die block, the die holder and the die block configured such that a square tube can rest diagonally on the die holder and die block.
Figure 10:
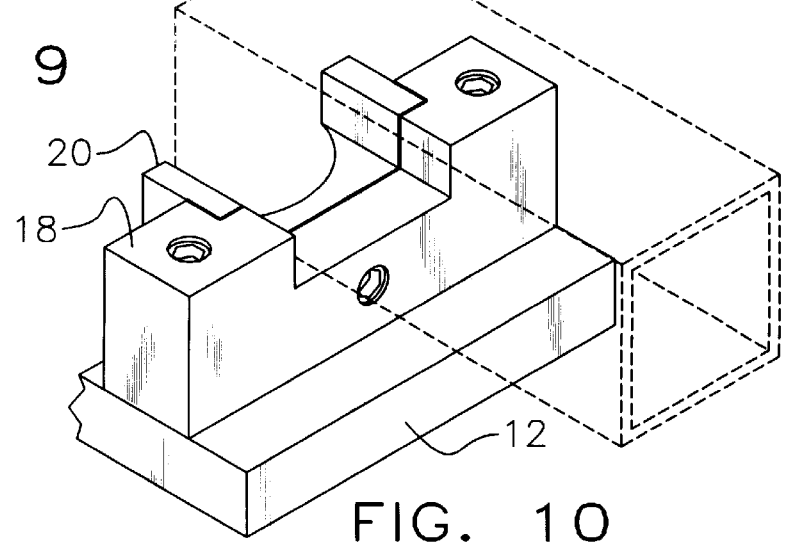
FIG. 10 is a perspective view of a portion of the present invention depicting the base plate, a die holder and a die block, the die holder and the die block configured such that a square tube can rest flatly on the die holder and die block.

Referring now to the drawings, in particular FIGS. 1–3, the invention which is a bantam twin pipe notcher depicted generally as 10, comprises a base plate 12; a first side die holder and a second side die holder forming two vertical parallel die holders 18, the vertical parallel die holders 18 being a predetermined distance apart; and the first side die holder 18 and the second side die holder 18, each having a vertical recessed intermediate portion 56, 58 extending from a bottom edge of each die holder to a top edge, the vertical recessed intermediate portions 56, 58 oriented so as to face each other. The vertical intermediate portions within each die holder receive a first die block 20 and a second die block 22. The first side die holder 18 and the second side die holder 18, each further include a horizontal groove 60 across a top surface of each die holder 18, the grooves 60 being configured to rest a pipe or tube (shown in phantom in FIGS. 8–10) to be cut. The invention further includes fastening means 34 for securing the vertical parallel die holders to the base plate. Such fastening means are known in the art, for example, ⁵⁄₁₆–18×1¾ socket head screws 34 are typically used.

The device further comprises alignment means for aligning the base plate 12 and vertical parallel die holders 18 to a press. The preferred embodiment of the alignment means for aligning the base plate 12 and vertical parallel die holders 18 to a press includes a bore extending through the base plate 12 and into a bottom surface near each edge of each vertical parallel die holder 18 at a predetermined depth therein and a spring pin 32 inserted in each bore, the spring pin 32 engaging a portion of the base plate 12 and a portion of the vertical parallel die holder 18.

The present invention further comprises a punch holder 14, the punch holder 14 being a rectangular-shaped plate having a first vertical side and a second vertical side with a horizontal cylindrical hole therethrough. The punch holder 14 has a first vertical bore therethrough near each outside edge of the punch holder and a second concentric larger vertical bore extending from a bottom surface of the punch holder 14 to a predetermined distance within the punch holder; and the base plate 12 further includes a vertical bore therethrough aligned with each of the first vertical bores near each outside edge of the punch holder 14. The device also comprises a guide pin 24 in close cooperative engagement, in other words, a slide fit with and inserted within each first vertical bore of the punch holder 14. The guide pin 24 extends from each vertical bore in the punch holder 14 aligned with the respective vertical bore in the base plate 12, and the guide pin is pressed fit into the base plate 12 vertical bore.

The guide pin 24 is inserted through a concentric compression spring 26, the spring being inserted within the second concentric larger vertical bore in the punch holder 14. A first end of the spring 26 is compressed against an edge formed between the first vertical bore and the second concentric vertical bore and a second end of said spring 26 extends a predetermined distance below the bottom surface of the punch holder and is compressed against a top surface of the base plate 12.

The device further comprises means for aligning and securing the punch holder 14 to the guide pins 24 for restricting the travel of the punch holder 14. The means for aligning and securing the punch holder 14 to the guide pins 24 comprise a notched recessed portion 40 in each guide pin 24, the notched recessed portion starting at a predetermined location juxtaposed the upper end 24a of each guide pin 24 and extending a predetermined length along each guide pin 24; a threaded bore 42 extending from a vertical edge 46 of the punch holder 14 into each first vertical bore 44 in the punch holder 14, the threaded bore 42 being aligned with the notched recessed portion 40 of each guide pin 24; and fastening means 30 threadedly engaged with the threaded bore 42 extending from the vertical edge 46 of the punch holder 14 into each first vertical bore 44 of the punch holder 14, the fastening means 30 protruding into each notched recessed portion 40 for engagement with a bottom surface 48 of the notched recessed portion within the guide pin 24.

The fastening means 30 threadedly engaged with the threaded bore 42 extending from the vertical edge 46 of the punch holder 14 into each first vertical bore of the punch holder 14 is typically a dog point set screw.

Figure 4:
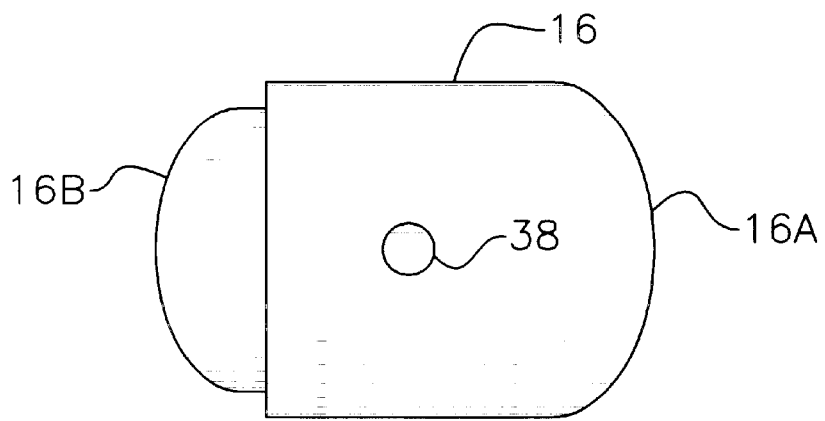
FIG. 4 is a perspective plan view of a punch depicting two different radii cutting edges.
Figure 5:
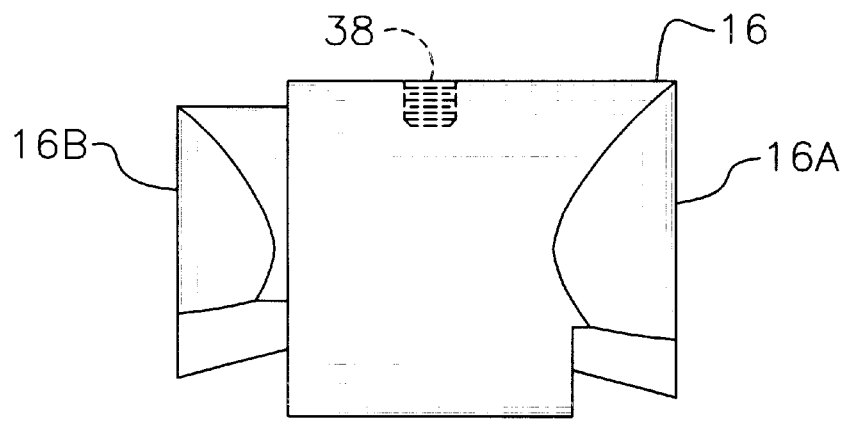
FIG. 5 is a perspective side elevational view of the punch depicted in FIG. 4.
Figure 6:
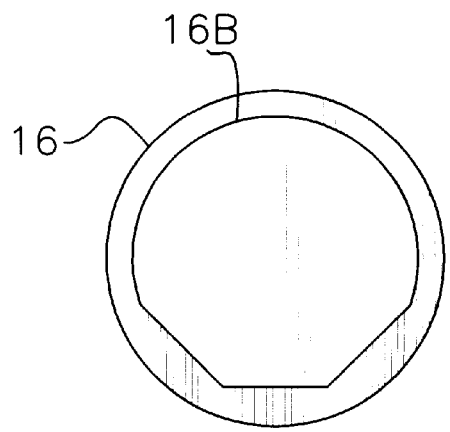
FIG. 6 is a perspective end view of the punch depicted in FIG. 4 depicting the smaller radius cutting edge.
Figure 7:
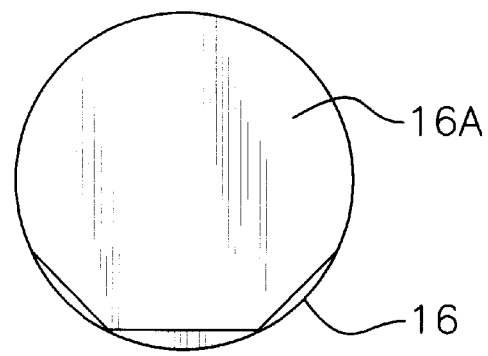
FIG. 7 is a perspective end view of the punch depicted in FIG. 4 depicting the larger radius cutting edge.

As shown in FIGS. 4–7, punch 16 has a first portion, an intermediate portion and a second portion, the intermediate portion being cylindrical-shaped and inserted within the horizontal cylindrical hole in the punch holder 14. The punch 16 and punch holder 14 combination includes means for fastening 36 the intermediate portion of the punch 16 within the punch holder 14 as shown in FIGS. 1 and 4–5.

The cutting edge included in the first portion of the punch 16 is capable of cutting a notch shaped differently than the notch created by the cutting edge included in the second portion of the punch 16.

A preferred embodiment of the means for fastening 36 the intermediate portion of the punch 16 within the punch holder 14 includes a threaded vertical bore 48 from a top surface of the punch holder 14 and extending into the horizontal cylindrical hole 50, the threaded vertical bore 48 being directionally aligned with a vertical axis of the horizontal cylindrical bore 50; and a bore 38 in the intermediate portion of the punch 16, the bore being at a predetermined depth, wherein the punch 16 is inserted in the punch holder 14 and fastening means 36, preferably a set screw, is inserted through the threaded vertical bore 48 at the top surface of the punch holder 14 and engages with the bore 38 in the intermediate portion of the punch 16.

The first and second portions of the punch 16 further include cutting edges adapted to enter the opening extremity or interior end of the pipe or tube (shown in phantom in FIGS. 8–10) to be notched.

Figure 11:
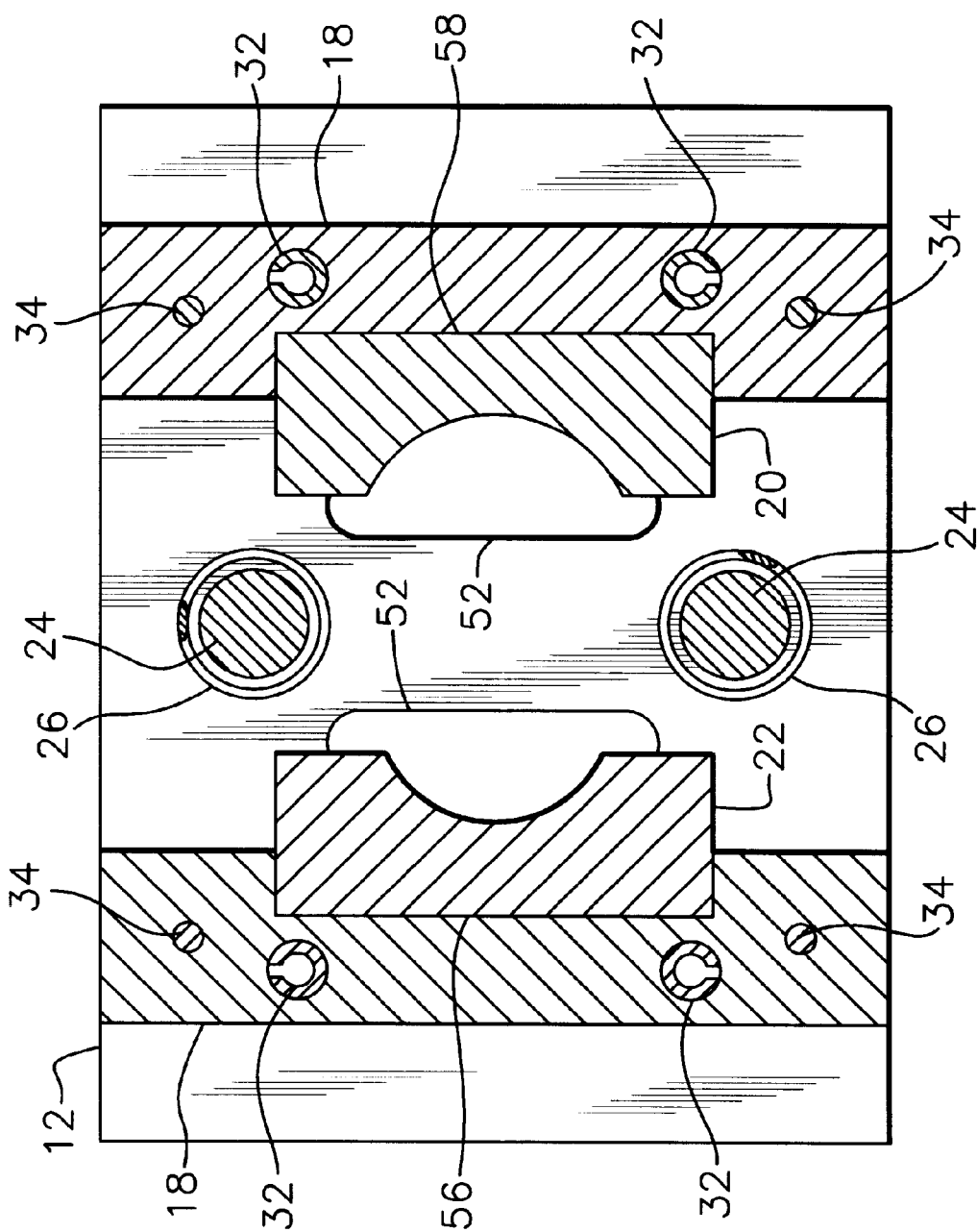
FIG. 11 is a perspective plan view of the invention with the punch and punch holder removed depicting the vertical notches in the die blocks.

The first die block 20 and the second die block 22 each rests on the base plate 12 with one side of each die block protruding within respective vertical intermediate portions of the first and second side die holders 18 and a second side of each die block being adjacent respective first and second vertical sides of the punch holder 14. Each die block 20 and 22 has a horizontal groove extending across a top surface of said die blocks, each groove being configured to rest the pipe or the tube to be cut, and each die block further having a vertical notch in the second side of said die blocks adapted to receive the cutting edge of said punch 16 as depicted in FIG. 11. The means 28 for fastening the die blocks 20, 22 to the die holders 18 are generally known in the art, for example, 5/16–18×1¼ socket head screws are typically used.

One embodiment of the base plate 12 as depicted in FIG. 11 includes an aperture 52 in the base plate under corresponding first and second portions of the punch 16 through which stock sheared from the notching of a pipe or tube can fall through the bottom 54 of the base plate 12. Typically, a clamping plate on a press to which the present invention is attached would incorporate an aperture through which sheared pipe stock waste can be discharged away from the notching work area.

The materials to manufacture the base plate, die holders punches and die blocks are generally known in the art. One generally known field of fabrication wherein the device will be valuable, among other areas, is the construction of railing. It is not unusual that railings will be fabricated where one size of pipe used is 1½ inch pipe and the other is 1¼ inch pipe. The present invention would have the capability to alternately notch both size pipes obviating the need to interchange the tool and die combination on the press being used.

One embodiment of the present invention includes horizontal grooves across the top surfaces of the first and second die blocks 20, 22 and the first side and the second side die holders 18 wherein the grooves are configured to rest the pipe or tube to be cut and are aligned with each other so that the pipe or tube to be cut rests simultaneously in the groove of a die block and a die holder.

As seen from the foregoing description, the present invention satisfies a long felt need to provide a device capable of notching two different size pipes or tubes without interchanging appropriate tool and die combinations, thereby providing valuable cost savings in the construction and fabrication industries.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A bantam twin pipe notcher for notching the ends of two different size pipes or tubes without interchanging a tool and die combination, comprising:

a base plate;

a first side die holder and a second side die holder forming two vertical parallel die holders, the vertical parallel die holders being a predetermined distance apart;

the first side die holder and the second side die holder, each having a vertical recessed intermediate portion extending from a bottom edge of each die holder to a top edge, the vertical recessed intermediate portions oriented so as to face each other, the vertical intermediate portions within each die holder for receiving a first die block and a second die block;

the first side die holder and the second side die holder, each further including a horizontal groove across a top surface of each die holder, the grooves being configured to rest a pipe or tube to be cut;

fastening means for securing the vertical parallel die holders to the base plate;

alignment means for aligning the base plate and vertical parallel die holders to a press;

a punch holder, the punch holder being a rectangular-shaped plate having a first vertical side and a second vertical side with a horizontal cylindrical hole therethrough;

the punch holder having a first vertical bore therethrough near each outside edge of the punch holder and a second concentric larger vertical bore extending from a bottom surface of the punch holder to a predetermined distance within the punch holder;

the base plate further including a vertical bore therethrough aligned with each of the first vertical bores near each outside edge of the punch holder;

a guide pin in close fit cooperative engagement with and inserted within each first vertical bore of the punch holder, the guide pin extending from each vertical bore in the punch holder aligned with the respective vertical bore in the base plate, the guide pin being pressed fit into said base plate vertical bore;

the guide pin further being inserted through a concentric compression spring, the spring being inserted within the second concentric larger vertical bore in the punch holder; a first end of said spring being compressed against an edge formed between the first vertical bore and the second concentric vertical bore and a second end of said spring extending a predetermined distance below the bottom surface of the punch holder and being compressed against a top surface of the base plate;

means for aligning and restricting a travel of the punch holder with the guide pins;

a punch having a first portion, an intermediate portion and a second portion, the intermediate portion being cylindrical-shaped and inserted within the horizontal cylindrical hole in the punch holder;

means for fastening the intermediate portion of the punch within the punch holder;

the first and second portions of the punch further including cutting edges adapted to enter the pipe or tube interior through an end of the pipe or tube to be notched;

the cutting edge included in the first portion of the punch and the cutting edge included in the second portion of the punch are shaped differently to notch two differently shaped notches on the ends of two different pipes or tubes without interchanging the tool and die combination;

the first die block and the second die block, each resting on the base plate, one side of each die block protruding within respective vertical intermediate portions of the first and second side die holders and a second side of each die block being adjacent respective first and second vertical sides of the punch holder;

each die block having a horizontal groove extending across a top surface of said die blocks, each groove being configured to rest the pipe or the tube to be cut, each die block further having a vertical notch in the second side of said die blocks adapted to receive the cutting edge of said punch; and means for fastening the die blocks to the die holder.

2. The bantam twin pipe notcher according to claim 1, wherein the alignment means for aligning the base plate and vertical parallel die holders to a press includes a bore extending through the base plate and into a bottom surface near each edge of each vertical parallel die holder at a predetermined depth therein and a spring pin inserted in each bore, the spring pin engaging a portion of the base plate and a portion of the vertical parallel die holder.

3. The bantam twin pipe notcher according to claim 1, wherein the means for aligning and restricting the travel of the punch holder with the guide pins comprises:

a notched recessed portion in each guide pin, the notched recessed portion starting at a predetermined location juxtaposed the upper end of each guide pin and extending a predetermined length along each guide pin;

a threaded bore extending from a vertical edge of the punch holder into each first vertical bore in the punch holder, the threaded bore being aligned with the notched recessed portion of each guide pin; and fastening means threadedly engaged with the threaded bore extending from the vertical edge of the punch holder into each first vertical bore of the punch holder, the fastening means protruding into each notched recessed portion for engagement with a bottom surface of the notched recessed portion within the guide pin.

4. The bantam twin pipe notcher according to claim 3, wherein the fastening means threadedly engaged with the threaded bore extending from the vertical edge of the punch holder into each first vertical bore of the punch holder is a dog point set screw.

5. The bantam twin pipe notcher according to claim 1, wherein the horizontal grooves across the top surfaces of the first and second die blocks and the first side and the second side die holders, configured to rest the pipe or tube to be cut, are aligned with each other so that the pipe or tube to be cut rests simultaneously in the groove of a die block and a die holder.

6. The bantam twin pipe notcher according to claim 1, wherein the means for fastening the intermediate portion of the punch within the punch holder comprises:
- a threaded vertical bore from a top surface of the punch holder and extending into the horizontal cylindrical hole, the threaded vertical bore being directionally aligned with a vertical axis of the horizontal cylindrical bore; and
- a bore in the intermediate portion of the punch, the bore being at a predetermined depth,
- wherein the punch is inserted in the punch holder and a set screw is inserted through the threaded vertical bore at the top surface of the punch holder and is engaged with the bore in the intermediate portion of the punch.

7. The bantam twin pipe notcher according to claim 1, wherein the base plate includes an aperture located through each portion of the base plate corresponding with the first and second portion of the punch, wherein a piece of material notched from the pipe or tube drops through the corresponding aperture in the base plate for eventual discharge through a bottom of said base plate and through a corresponding aperture in a clamping table to which the bantam twin pipe notcher is attached.

* * * * *